(12) United States Patent
Bode

(10) Patent No.: US 12,358,393 B2
(45) Date of Patent: Jul. 15, 2025

(54) MODULAR MEASURING UNIT AND AUTHENTICATION APPARATUS FOR DETECTING ENERGY OUTPUT

(71) Applicant: Siemens Aktiengesellschaft, Munich (DE)

(72) Inventor: Sebastian Bode, Ahlen (DE)

(73) Assignee: Siemens Aktiengesellschaft, Munich (DE)

( * ) Notice: Subject to any disclaimer, the term of this patent is extended or adjusted under 35 U.S.C. 154(b) by 707 days.

(21) Appl. No.: 17/615,211

(22) PCT Filed: Apr. 1, 2020

(86) PCT No.: PCT/EP2020/059186
§ 371 (c)(1),
(2) Date: Nov. 30, 2021

(87) PCT Pub. No.: WO2020/244829
PCT Pub. Date: Dec. 10, 2020

(65) Prior Publication Data
US 2022/0227250 A1    Jul. 21, 2022

(30) Foreign Application Priority Data
Jun. 6, 2019 (DE) ............ 10 2019 208 283.1

(51) Int. Cl.
*B60L 53/66* (2019.01)
*B60L 53/16* (2019.01)
(Continued)

(52) U.S. Cl.
CPC ............ *B60L 53/665* (2019.02); *B60L 53/16* (2019.02); *B60L 53/305* (2019.02); *B60L 53/65* (2019.02); *G06F 21/32* (2013.01); *G06Q 20/352* (2013.01)

(58) Field of Classification Search
CPC ...... B60L 53/665; B60L 53/305; B60L 53/16; B60L 53/65; G06F 21/32; G06Q 20/352
(Continued)

(56) References Cited

U.S. PATENT DOCUMENTS

| 2010/0198751 A1 | 8/2010 | Jacobus |
| 2010/0271234 A1 | 10/2010 | Moulard |

(Continued)

FOREIGN PATENT DOCUMENTS

| CN | 101932911 A | 12/2010 |
| CN | 104094272 A | 10/2014 |

(Continued)

OTHER PUBLICATIONS

German Office Action for German Application No. 10 2019 208 283.1 dated Feb. 7, 2020.

(Continued)

*Primary Examiner* — Nathaniel R Pelton
(74) *Attorney, Agent, or Firm* — Lempia Summerfield Katz LLC

(57) ABSTRACT

The disclosure relates to a modular measuring unit comprising a measuring module and an access module. The measuring module and the access module are connected via an interface internal to the measuring unit. The defined interface guarantees modular isolation of the measuring module for the determination of a measured data item from the access module for generating a measuring data set with assignment of an identification data item. Because of this modular isolation, technical changes or developments in the access module do not necessarily lead to a loss of an approval under calibration legislation of the measuring module, as its core function significant under calibration legislation remains untouched. The modular measuring unit (Continued)

interacts with an authentication apparatus, which may be provided as a remote instance apart from a charging station.

13 Claims, 2 Drawing Sheets

(51) Int. Cl.
  *B60L 53/30* (2019.01)
  *B60L 53/65* (2019.01)
  *G06F 21/32* (2013.01)
  *G06Q 20/34* (2012.01)
(58) Field of Classification Search
  USPC .......................................................... 320/109
  See application file for complete search history.

(56) References Cited

U.S. PATENT DOCUMENTS

| | | | |
|---|---|---|---|
| 2011/0035338 A1 | 2/2011 | Kagan et al. | |
| 2013/0231894 A1* | 9/2013 | Paakkonen | H01M 10/42 |
| | | | 702/183 |
| 2014/0346982 A1 | 11/2014 | Brochhaus | |
| 2014/0375474 A1 | 12/2014 | Dietrich et al. | |
| 2016/0210478 A1 | 7/2016 | Brochhaus | |
| 2019/0324150 A1* | 10/2019 | Konschak | G01S 19/07 |
| 2021/0240858 A1* | 8/2021 | Tsafack Chetsa | G06Q 20/401 |
| 2021/0295615 A1* | 9/2021 | Gotovac | B60L 53/665 |

FOREIGN PATENT DOCUMENTS

| | | |
|---|---|---|
| CN | 105556984 A | 5/2016 |
| DE | 102010032580 A1 | 11/2011 |
| DE | 102012203518 A1 | 9/2013 |
| DE | 102013209443 A1 | 11/2014 |
| EP | 0598520 A2 | 5/1994 |
| GB | 2272529 A | 5/1994 |

OTHER PUBLICATIONS

PCT International Search Report and Written Opinion of International Searching Authority mailed Jul. 16, 2020 corresponding to PCT International Application No. PCT/EP2020/059186.

* cited by examiner

MODULAR MEASURING UNIT AND AUTHENTICATION APPARATUS FOR DETECTING ENERGY OUTPUT

The present patent document is a § 371 nationalization of PCT Application Serial No. PCT/EP2020/059186, filed Apr. 1, 2020, designating the United States, which is hereby incorporated by reference, and this patent document also claims the benefit of German Patent Application No. 10 2019 208 283.1, filed Jun. 6, 2019, which is also hereby incorporated by reference.

TECHNICAL FIELD

The disclosure relates to a modular measuring unit, in particular for measuring an electrical energy drawn by an energy sink, as well as to an authentication apparatus.

BACKGROUND

Electric vehicles or vehicles which are at least partially driven with electrical energy have at least one accumulator battery which may be charged regularly during ongoing operation of the electric vehicle. Charging the electric vehicle takes place at a charging station (also known as electric vehicle supply equipment or abbreviated to EVSE within the industry) which is connected to the electric vehicle via a charging cable or also by wireless, inductive coupling. One or a plurality of measuring units installed in the charging station are used to detect the electrical energy transferred from the charging station to the electric vehicle.

Increasing development of charging infrastructure including different charging stations is resulting in greater attention being paid to providing tamper-proof, traceable, and verifiable billing of the electrical energy transferred. A calibrated measuring device for measuring the electrical energy transferred to the electric vehicle or, in general, to an energy sink forms a basis for this. The requirements for measuring devices of this type are characterized by specifications concerning calibration law.

A development towards innovative measuring devices may currently be observed, which are no longer necessarily designed in one piece, but rather realize certain functions, (e.g., a display of the measured value), in a remote component. A new measuring device of this type is therefore also referred to using the term measuring unit hereinafter. Measuring units of this type not only include a monolithic measuring device supplied in a housing which may be installed, but rather the measuring units may also contain a plurality of communicatively connected components.

A higher level of complexity of the measuring unit, (e.g., in terms of a multiplicity of remote components), results in a greater need for adjustments. Furthermore, a possibility in principle to carry out developments on components quickly also results in an increasing need for developments of this type. The specifications mentioned previously concerning calibration law impede freedom of design in measuring units of this type, because a change to individual components of this measuring unit may result in a loss of approval.

The development of modern measuring units is characterized by a further requirement, according to which their measured values may be provided with an identification datum of a user of the electrical energy drawn by the energy sink. At public charging stations available to a user for charging their electric vehicle, e.g., the energy sink, the respective user is primarily identified for billing the electrical power drawn. This requirement is more extensive than requirements for household energy meters or "electric meters", in the case of which only the energy sink, (e.g., an entire household), is identified. In the case of household energy meters, an identification of the energy sink may take place via a counter number. More extensive detailing of a user is currently not technically provided in the case of household energy meters and is also not necessary for billing. However, at public charging stations, the respective user is identified for billing the electrical power drawn.

At current public charging stations available to a user for charging their electric vehicle, the determination of the user and their authentication takes place by the user registering, (e.g., using a card). The electrical power drawn is then merely measured by a current measuring unit, while an allocation of measurement data to the user which are required for billing takes place by way of the charging station. The result of this allocation is then a billing data set, in the case of which the measurement data on the electrical power drawn are set out in detail and then allocated to an authenticated user.

In other words, current public charging stations require a central control system in which determination of the user, authentication of the user, and creation of a billing data set are implemented. With a forecastable increasing number of public charging stations, it appears to be desirable to relocate some of these implementations from the central control system of the charging station to a remote instance or to distributed components inside or outside the charging station and thus to reduce the technical effort for the development and the operation of the central control system of a current charging station.

SUMMARY AND DESCRIPTION

The object of the disclosure is to specify mechanisms for authenticating a user and for allocating a measurement data set to a user which may be carried out by a measuring unit in cooperation with a remote authentication apparatus, wherein technical developments of the measuring unit do not necessarily result in a loss of approval of a measuring module of the measuring unit.

The object is achieved by a modular measuring unit as well as by an authentication apparatus. The scope of the present disclosure is defined solely by the appended claims and is not affected to any degree by the statements within this summary. The present embodiments may obviate one or more of the drawbacks or limitations in the related art.

According to the disclosure, a modular measuring unit is provided. The modular measuring unit includes a measuring module and an access module. The measuring module and the access module are connected via a measuring unit internal interface. This defined interface guarantees a modular separation of the measuring module for determining a measurement datum from the access module for generating a measurement data set with allocation of an identification datum. Owing to this modular separation, technical changes, or developments, (e.g., software updates), in the access module do not necessarily result in a loss of approval, concerning calibration law, of the measuring module, because its core function, which is significant under calibration law, (e.g., the measurement of an electrical measured variable), remains untouched.

A measuring unit installed in a charging station itself takes over, in cooperation with the authentication apparatus, a determination of an authorized user as well as the generation of the measurement data set with allocation of the identification datum which identifies the user. The measuring unit thus advantageously relieves a central control system of a charging station from the creation of a user-individualized measurement data set.

The modular measuring unit is configured to cooperate with an authentication apparatus, which may be provided as an instance or remote instance which is remote from a charging station, in order thereby to further reduce technical effort for the development and operation of the central control system of the charging station.

The modular measuring unit includes in detail a measuring module for measuring at least one electrical measured variable and for determining at least one measurement datum from the measured variable, as well as an access module. The access module includes a measuring unit internal interface for receiving the at least one measurement datum from the measuring module, a cryptographically secured, measuring device external interface for receiving an authentication datum and for sending at least one measurement data set, as well as a control unit for taking an identification datum underlying the authentication datum from the authentication datum and for generating the at least one measurement data set. The measurement data set contains the identification datum and at least one measurement datum.

The authentication apparatus includes, in detail, a user administration module for detecting a user based on an identification datum, an authentication module for generating an authentication datum based on an authentication of the identification datum, a cryptographically secured external interface for transferring the authentication datum and for receiving at least one measurement data set (containing the identification datum and at least one measurement datum), and a processing module for creating a billing data set for a user determined by the user administration module based on its identification datum. The billing data set includes a price weighting of the measurement data set.

Both devices, (i.e., the modular measuring unit and the authentication apparatus), cooperate in the object of allocating an authorized user to a measurement data set and complement each other when creating a user-individual billing data set, wherein both the modular measuring unit and the authentication apparatus contribute individually to achieving the underlying object.

According to one configuration of the modular measuring unit, a structural separation is provided between the access module and the measuring module inside the measuring unit. This structural separation guarantees a modular separation of the measuring module for determining a measurement datum from the access module for generating a measurement data set with allocation of an identification datum, such that changes in the access module do not necessarily result in a loss of approval, concerning calibration law, of the measuring module, its core function which is significant under calibration law remaining untouched.

According to one configuration of the modular measuring unit, the measuring unit internal interface is provided between the access module and the measuring module to be formed by a releasable plug connection. This measure simplifies a change in the function of the access module through a technically uncomplicated exchange of an access module which is to be changed for an exchanged access module of new design.

According to one configuration of the modular measuring unit, the additional measurement data set contains an identification datum of the measuring unit, an identification datum of the measuring module, an identification datum of the access module, and/or time information allocated to the measurement datum.

According to one configuration of the authentication apparatus, an application interface with a service application or even to a service application is provided for detecting and authenticating the identification datum. An application interface of this type is also referred to as an application programming interface or API within the industry. For example, a remote service application of a payment service is integrated, in order to authenticate a specified identification datum of a user in such a way that there is an account with the payment service under a specified identification datum. The user is then confirmed as authorized via the application interface.

According to one configuration of the authentication apparatus, an input device separated from the authentication apparatus is provided for detecting and authenticating the identification datum. An input device of this type may also be localized at a charging station. According to this configuration, this input device localized at the charging station is not connected to a central control system inside the charging station, but rather is controlled by the (e.g., remote) authentication apparatus, for example, via a common network connection. The central control system inside the charging station is thus advantageously further relieved.

According to one configuration of the authentication apparatus, the detection of the identification datum takes place via manual user input, via detection of biometric user data, and/or via contactless or contact based reading of a user card.

According to one further configuration, a billing system for billing an electrical energy drawn by an energy sink provides a plurality of modular measuring units as well as an authentication apparatus which communicates with the modular measuring unit. The modular measuring units are at least indirectly allocated to the respective energy sink in terms of measuring technology. In this case, an indirect allocation of the measuring units to the energy sink in terms of measuring technology means, for example, that a measurement does not take place directly at a transfer point of the electrical power, but rather at a connection point of a charging cable on the charging station side, for example. In contrast, a direct allocation of the measuring unit to the energy sink in terms of measuring technology means a measurement at the transfer point, e.g., at the vehicle end or at the vehicle connector device of the charging cable plugged into a corresponding socket on the vehicle. Providing a direct allocation of the measuring unit in terms of measuring technology at this point is (e.g., due to size and weight restrictions of the connector device), may not be practical.

BRIEF DESCRIPTION OF THE DRAWINGS

Further exemplary embodiments and advantages of the disclosure are explained in greater detail hereinafter using the drawings. In the drawings.

DETAILED DESCRIPTION

Figure 1:
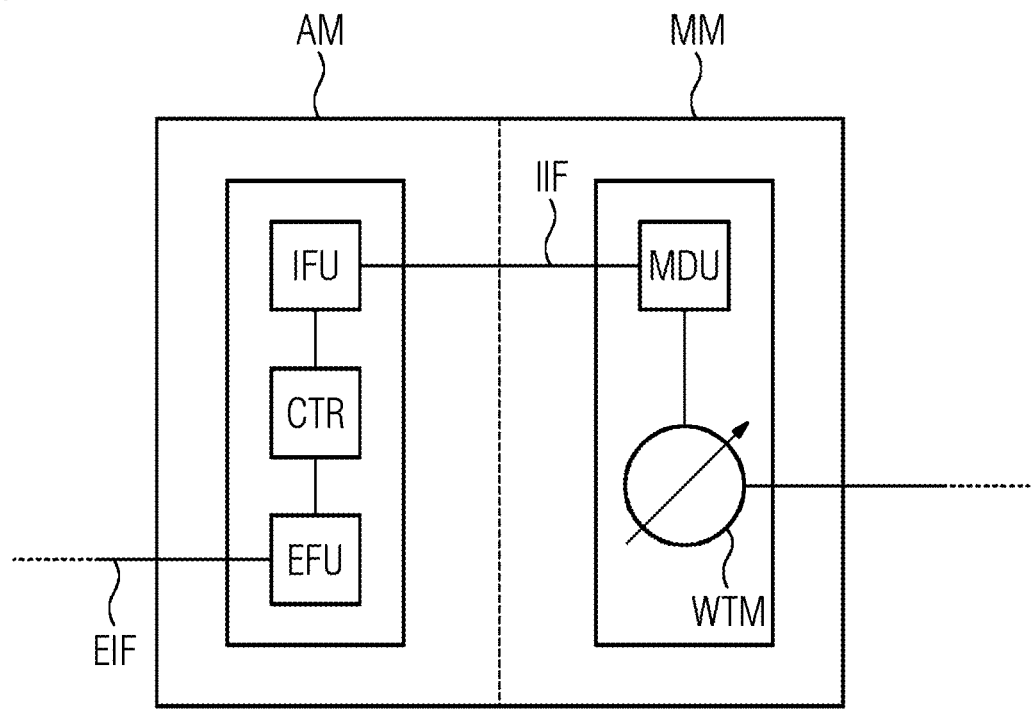
FIG. 1 depicts a schematic diagram of a modular measuring unit according to an embodiment.

FIG. 1 depicts a schematic diagram of a modular measuring unit. The measuring unit includes a measuring module MM for measuring at least one electrical measured variable. For this purpose, a measuring device WTM is provided, for example, which is at least indirectly allocated to an energy sink (not represented) in terms of measuring technology. In this case, electrical measured variables, (e.g., an electrical voltage, a current strength, an electrical power, or an electrical energy), are measured at the same time, possibly using further (not represented) measuring devices.

The electrical power may either be measured directly, wherein the measuring device WTM is configured as a power measuring device, or the electrical power may be determined indirectly by product formation of two electrical measured variables, (e.g., voltage and current strength).

The electrical energy may either be measured directly, wherein the measuring device WTM is designed as an energy meter, or the electrical energy may be measured indirectly, by way of temporal integration of the measured or determined electrical power.

A constant electrical power drawn by the energy sink in certain time periods may be detected together with the temporal duration of an electrical power, which is constant during this period of time. This measure allows for later traceability regarding at which times and in which time periods an electrical power output from a charging station was varied, for example, during a fast charging phase which was followed by a trickle charge phase.

In a measurement data generation unit MDU inside the measuring module MM, the at least one electrical measured variable is processed. At least one digital measurement datum is output to a measuring unit internal interface IIF as a result of this processing, wherein one or a plurality of digitally output measurement data, in addition to the values for the determined or measured electrical power, also include the respective period of time for which an electrical power detected during a period of time remained substantially constant. Instead of or additionally to periods of time, a specification of time stamps may also be provided in the at least one measurement datum.

A structural separation is provided between the access module AM and the measuring module MM in the modular measuring unit, wherein the two modules AM,MM are connected by the measuring unit internal interface IIF. The physical level of this interface IIF may be formed by a data cable with plug connections which are releasable on both sides.

The access module AM includes an internal interface unit IFU for connecting the functional units of the access module AM to the measuring unit internal interface IIF, a control unit CTR, as well as an external interface unit EFU for connecting the functional units of the access module AM to a cryptographically secured, measuring device external interface EIF.

The control unit CTR processes an authentication datum received from the external interface unit EFU via the cryptographically secured measuring device external interface EIF in such a way that an identification datum underlying the authentication datum is taken from the authentication datum. A simply designed authentication datum includes the identification datum together with information regarding whether the identification datum is authenticated.

In the case of specified authentication of an identification datum, which may be allocated to a user outside the modular measuring unit, (e.g., in the authentication apparatus), the control unit CTR generates a measurement data set which contains the identification datum and at least one measurement datum.

After completing the charging process, the measurement data set is completed by the control unit CTR and is subsequently sent by the external interface unit EFU via the cryptographically secured measuring device external interface EIF.

Figure 2:
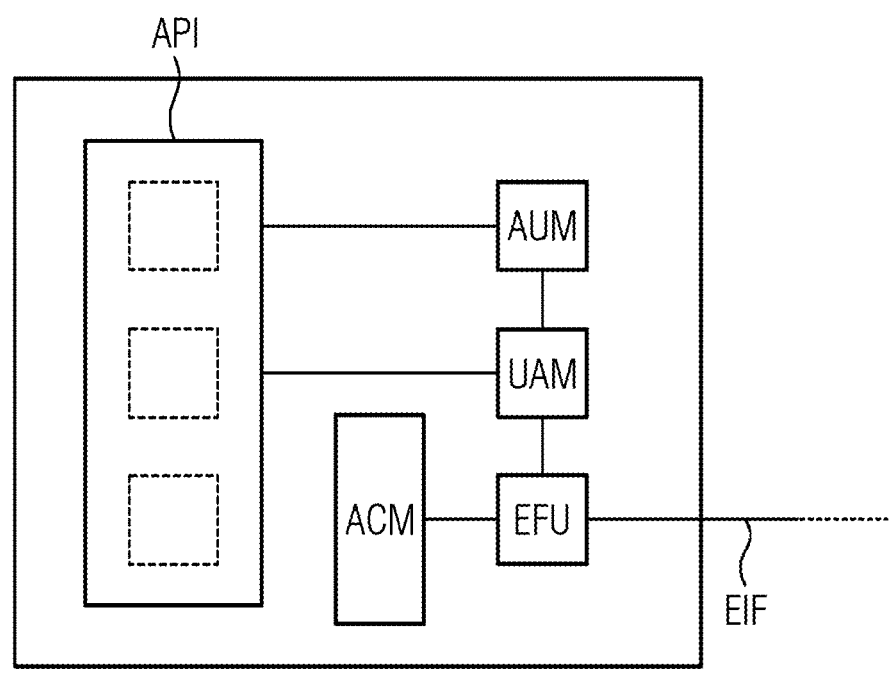
FIG. 2 depicts a schematic diagram of an authentication apparatus according to an embodiment.

FIG. 2 shows a schematic diagram of an authentication apparatus. The authentication apparatus includes a user administration module UAM for detecting a user based on an identification datum. It is standard practice for an account name, (e.g., an email address or a user ID), to be used as an identification datum, which is transferred to the authentication apparatus from an input device (not represented) remote from the authentication apparatus, for example. In addition to manual user input of this type, provision may also be made for detection of biometric user data, or contactless or contact based reading of a user card for inputting the identification datum. The aforementioned functional units for inputting or transferring the identification datum are connected via an application interface API of the authentication apparatus, for example. Via this application interface API, provision may also be made for data exchange with a service application for transferring the identification datum.

An authentication module AUM is provided for authenticating a user based on the identification datum which is allocated to or may be allocated to the user. In the case of a positive authentication of the identification datum, the authentication module AUM generates an authentication datum which is transferred from an external interface unit EFU of the authentication apparatus to the modular measuring unit via a cryptographically secured external interface EIF.

An identical reference symbol for the measuring device external interface EIF operated by the modular measuring unit and for the external interface EIF operated by the authentication apparatus expresses that both external interfaces EIF form a common interface EIF which is shared by both.

An identical reference symbol for the external interface unit EFU operated by the modular measuring unit and for the external interface unit EFU operated by the authentication apparatus expresses that both interface units are configured or operated in a substantially similar manner but may be formed separately.

A remote service application of a payment service may also be integrated for authentication, in order to authenticate a specified identification datum of a user in such a way that there is an account with the payment service under a specified identification datum. The user is then confirmed as authenticated or authorized via the application interface.

Moreover, the authentication apparatus includes an accounting module ACM for creating a billing data set based on the measurement data set generated by the modular measuring unit, which measurement data set is sent by the measuring unit via the cryptographically secured external interface EIF and is received by the external interface unit EFU of the authentication apparatus.

The received measurement data set refers to the user determined by the user administration module UAM based on its identification datum. The billing data set includes a price weighting of the measurement data set.

Figure 3:
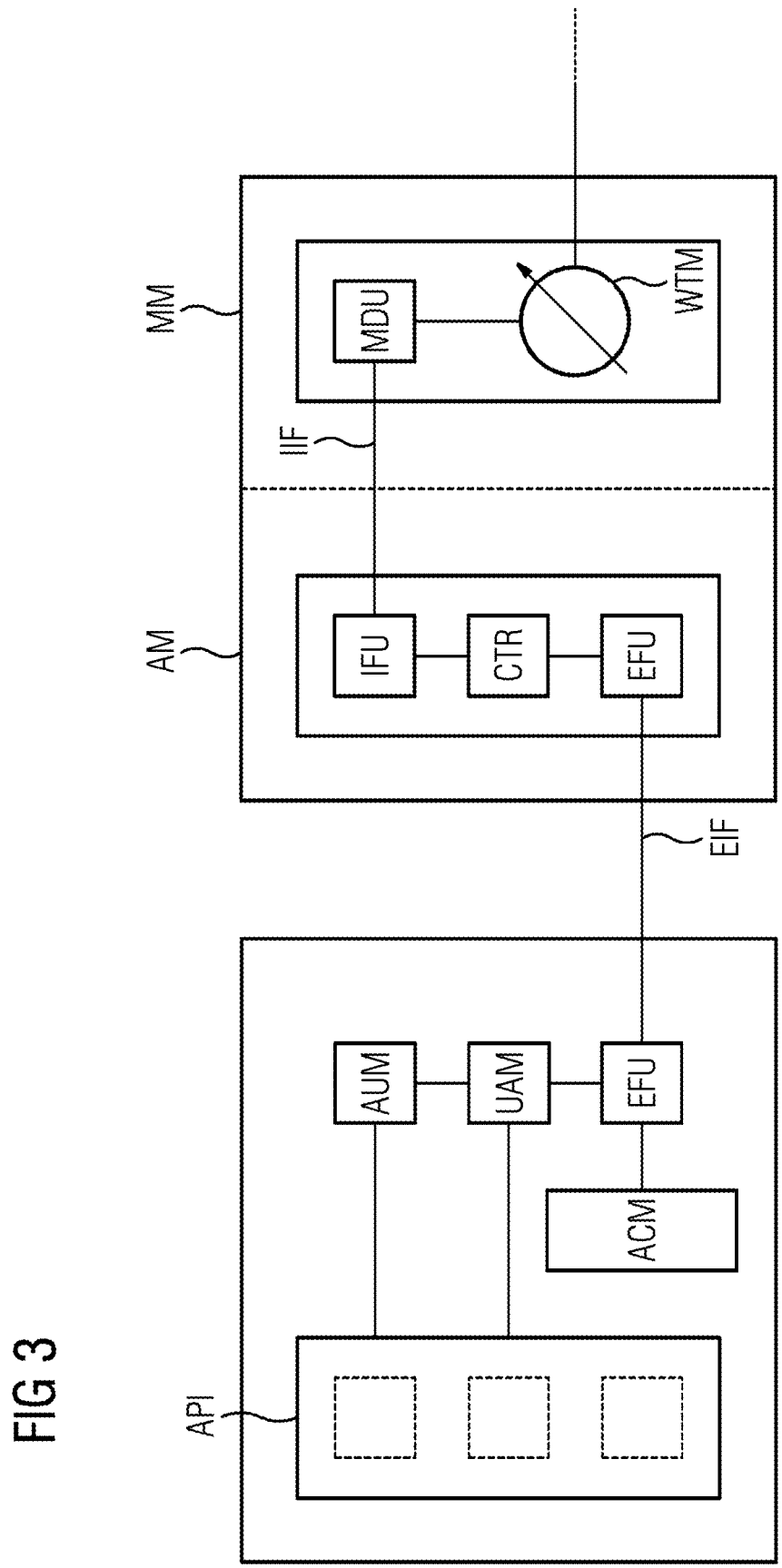
FIG. 3 depicts a schematic diagram of a billing system according to an embodiment.

FIG. 3 shows a schematic diagram of a billing system for billing an electrical energy drawn by an energy sink according to one exemplary embodiment.

The billing system includes (as represented graphically) a modular measuring unit or a plurality of modular measuring units which are at least indirectly allocated to the energy sink (not represented) in terms of measuring technology as well as an authentication apparatus which communicates with the measuring units according to the preceding statements.

The contribution is evident in particular in a simplification of the authentication. While a multiplicity of different authentication variants, (e.g., registering with a prepaid card, registering with a credit card, registering with PIN, etc.), had to be implemented in a charging station using previously known mechanisms, authentication is relocated to a central authentication apparatus.

A central control system of a charging station is advantageously further relieved from an assessment of the authentication, which, is allocated to the modular measuring unit in cooperation with the authentication apparatus.

Owing to the modular measuring unit, the measuring module contained therein itself remains "stable" against changes in further modules of the modular measuring unit. In the event of changes to the latter modules, the approval, concerning calibration law, of the unchanged measuring module remains guaranteed.

By separating the measurement function from the authentication function, respective subtasks may be achieved by way of specialized component designers in each case. In this way, tested authentication solutions may be incorporated into innovative measuring devices in a simple manner and may be recycled for a multiplicity of different measuring devices.

One further advantage is that, owing to the modular design, authentication methods may be disabled in a simple manner if they are no longer considered to be safe as a result of a weakness found in underlying cryptographic methods, for example. In this way, loss of approval may be avoided.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A modular measuring unit comprising:
 a measuring device configured to measure at least one electrical measured variable and determine at least one measurement datum from the at least one electrical measured variable; and
 an internal interface configured to receive the at least one measurement datum from the measuring device;
 a cryptographically secured external interface configured to: (1) receive an authentication datum from a cryptographically secured external interface of an apparatus based on an authentication of an identification datum by the apparatus; and (2) send at least one measurement data set to the cryptographically secured external interface of the apparatus; and
 a control unit configured to take the identification datum underlying the authentication datum from the authentication datum and generate the at least one measurement data set, wherein the at least one measurement data set comprises the identification datum and the at least one measurement datum,
 wherein a structural separation is present between the measuring device and the control unit within the modular measuring unit, and
 wherein updates to the control unit of the modular measuring unit occur without affecting the measuring device of the modular measuring unit based on the structural separation.

2. The modular measuring unit of claim 1, wherein the internal interface provided between the control unit and the measuring device is a releasable plug connection.

3. The modular measuring unit of claim 2, wherein the measurement data set comprises the identification datum, time information allocated to the at least one measurement datum, or a combination thereof.

4. The modular measuring unit of claim 1, wherein the modular measuring unit is further configured to measure an electrical energy drawn by an energy sink.

5. The modular measuring unit of claim 1, wherein the measurement data set comprises the identification datum, time information allocated to the at least one measurement datum, or a combination thereof.

6. The modular measuring unit of claim 1, wherein the measuring device comprises an energy meter.

7. An apparatus comprising:
 a cryptographically secured external interface configured to transfer an authentication datum to a cryptographically secured external interface of a modular measuring unit and receive at least one measurement data set from the cryptographically secured external interface of the modular measuring unit, wherein the at least one measurement data set is generated by a control unit of the modular measuring unit, and wherein the at least one measurement data set comprises an identification datum and at least one measurement datum determined from at least one electrical measured variable measured by a measuring device of the modular measuring unit,
 wherein the apparatus is configured to:
  detect a user based on the identification datum;
  generate the authentication datum based on an authentication of the identification datum; and
  create a billing data set for the user based on the identification datum, wherein the billing data set comprises a price weighting of the at least one measurement data set.

8. The apparatus of claim 7, further comprising:
 an application interface with a service application configured to detect and authenticate the identification datum.

9. The apparatus of claim 8, further comprising:
 an input device configured to detect and authenticate the identification datum.

10. The apparatus of claim 9, wherein the detection of the identification datum takes place via manual user input, via detection of biometric user data, via contactless or contact based reading of a user card, or a combination thereof.

11. The apparatus of claim 7, further comprising:
 an input device configured to detect and authenticate the identification datum.

12. The apparatus of claim 11, wherein the detection of the identification datum takes place via manual user input, via detection of biometric user data, via contactless or contact based reading of a user card, or a combination thereof.

13. A billing system configured to bill an electrical energy drawn by an energy sink, the billing system comprising:
- at least one modular measuring unit at least indirectly allocated to the energy sink in terms of measuring technology; and
- an apparatus configured to communicate with the at least one modular measuring unit,
- wherein the at least one modular measuring unit comprises:
  - a measuring device configured to measure at least one electrical measured variable and determine at least one measurement datum from the at least one electrical measured variable; and
  - an internal interface configured to receive the at least one measurement datum from the measuring device;
  - a cryptographically secured external interface configured to receive an authentication datum from the apparatus and send at least one measurement data set to the apparatus; and
  - a control unit configured to take an identification datum underlying the authentication datum from the authentication datum and generate the at least one measurement data set, wherein the at least one measurement data set comprises the identification datum and the at least one measurement datum,
- wherein a structural separation is present between the measuring device and the control unit within the modular measuring unit, therein providing for updates to the control unit without affecting the measuring device, and
- wherein the apparatus comprises:
  - the cryptographically secured external interface configured to transfer the authentication datum to the at least one modular measuring unit and receive the at least one measurement data set from the at least one modular measuring unit, wherein the at least one measurement data set comprises the identification datum and the at least one measurement datum, and
- wherein the apparatus is configured to:
  - detect a user based on the identification datum;
  - generate the authentication datum based on an authentication of the identification datum; and
  - create a billing data set for the user based on the identification datum, wherein the billing data set comprises a price weighting of the at least one measurement data set.

* * * * *